United States Patent
Ausserlechner et al.

(10) Patent No.: US 10,386,250 B2
(45) Date of Patent: Aug. 20, 2019

(54) DETECTION COMPENSATION OF MECHANICAL STRESSES

(71) Applicant: Infineon Technologies AG, Neubiberg (DE)

(72) Inventors: Udo Ausserlechner, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 243 days.

(21) Appl. No.: 15/048,398

(22) Filed: Feb. 19, 2016

(65) Prior Publication Data
US 2016/0245668 A1 Aug. 25, 2016

(30) Foreign Application Priority Data

Feb. 20, 2015 (DE) .................. 10 2015 102 479
Mar. 3, 2015 (DE) .................. 10 2015 103 075

(51) Int. Cl.
| | | |
|---|---|---|
| *G01L 1/18* | (2006.01) | |
| *G01L 1/26* | (2006.01) | |
| *G01D 3/036* | (2006.01) | |
| *G01L 5/00* | (2006.01) | |

(52) U.S. Cl.
CPC .............. *G01L 1/18* (2013.01); *G01D 3/0365* (2013.01); *G01L 1/26* (2013.01); *G01L 5/0047* (2013.01)

(58) Field of Classification Search
CPC . G01D 3/028; G01L 1/18; G01B 7/16; G01K 7/00

USPC .................................................. 324/251, 691
See application file for complete search history.

(56) References Cited

U.S. PATENT DOCUMENTS

| | | | |
|---|---|---|---|
| 6,906,514 B2 | 6/2005 | Ausserlechner | |
| 7,980,138 B2 * | 7/2011 | Ausserlechner | ........ G01L 5/162 73/763 |
| 8,723,515 B2 * | 5/2014 | Motz | .................. G01R 33/0029 324/117 H |
| 9,322,840 B2 * | 4/2016 | Ausserlechner | ...... G01P 15/123 |
| 2012/0210800 A1 | 8/2012 | Huber et al. | |

FOREIGN PATENT DOCUMENTS

| | | |
|---|---|---|
| CH | 704509 A1 | 8/2012 |
| CN | 102261922 A | 11/2011 |
| CN | 103261863 A | 8/2013 |
| CN | 203550968 U | 4/2014 |
| EP | 0548391 A1 | 6/1993 |

(Continued)

OTHER PUBLICATIONS

H. Kittel, et al., "Novel Stress Measurement System for Evaluation of Package Induced Stress", German Federal of Ministry of Research Technology, 8 pgs.

(Continued)

*Primary Examiner* — Dinh T Le
(74) *Attorney, Agent, or Firm* — Schiff Hardin LLP

(57) ABSTRACT

A carrier of an electronic circuit, the carrier including a first sensor for determining a first signal based on a sum of a first normal stress component and a second normal stress component, and a second sensor for determining a second signal based on a difference between the first normal stress component and a second normal stress component. Also, a corresponding circuit, method and device.

19 Claims, 3 Drawing Sheets

(56) References Cited

FOREIGN PATENT DOCUMENTS

EP         1496344  A2      1/2005

OTHER PUBLICATIONS

Y. Rui-feng, et al., "Stress-Senstive MOS Operational Amplifier", ACTA Electronica Sinica, vol. 29, No. 8, 3 pgs., Aug. 2001.
Y. Kanda, "Piezoresistance Effect of Silicon", Elsevier Sequoia, Lusanne, 9 pgs., 1991.
German Patent Office, Office Action issued for DE 102015103075.6, 5 pgs., dated Jan. 21, 2016.
Office Action dated Mar. 23, 2018 for Chinese Patent Application No. 201610092489.9.

\* cited by examiner

DETECTION COMPENSATION OF MECHANICAL STRESSES

BACKGROUND OF THE DISCLOSURE

The disclosure refers to a carrier for detecting a mechanical stress, a circuit for reducing a disturbance which is based on mechanical stress and a method for reducing such a disturbance.

U.S. Pat. No. 6,906,514 B1 discloses a circuit for stress compensation.

U.S. Pat. No. 7,437,260 B2 discloses providing a mechanical stress sensor based on a p- and n-doped resistor.

U.S. Pat. No. 7,980,138 B1 discloses a mechanical stress sensor comprising a lateral and a vertical resistor of equal doping type.

U.S. Pat. No. 8,240,218 B2 shows a mechanical stress sensor comprising a common well with three contact elements.

It is known to determine mechanical stress which may have a disturbing impact on electronic components. It is, however, a disadvantage that known stress compensation circuits are not able to determine arbitrary mechanical stress components. This limits the appliances as well as the possibilities for compensation.

SUMMARY

A first embodiment relates to a carrier of an electronic circuit
  comprising a first sensor for determining a first signal based on a sum of a first normal stress component and a second normal stress component,
  comprising a second sensor for determining a second signal based on a difference between the first normal stress component and a second normal stress component.

A second embodiment relates to a circuit for reducing a disturbance, which is based on a mechanical stress, the circuit comprising:
  a first sensor for determining a first signal based on a sum of a first normal stress component and a second normal stress component;
  a second sensor for determining a second signal based on a difference of the first normal stress component and the second normal stress component;
  a processing unit, which is arranged to reduce based on the first signal and the second signal a disturbance that resulted from the mechanical stress.

A third embodiment relates to a method comprising:
  reducing via a first signal and via a second signal a disturbance, which is caused by mechanical stress,
  wherein the first signal of a first sensor is determined based on a sum of a first normal stress component and a second normal stress component and
  wherein the second signal of a second sensor is determined based on a difference of the first normal stress component and the second normal stress component.

A fourth embodiment is directed to a device comprising:
  means for reducing via a first signal and via a second signal a disturbance which is caused by mechanical stress,
  wherein the first signal of a first sensor is determined based on a sum of a first normal stress component and a second normal stress component and
  wherein the second signal of a second sensor is determined based on a difference of the first normal stress component and the second normal stress component.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
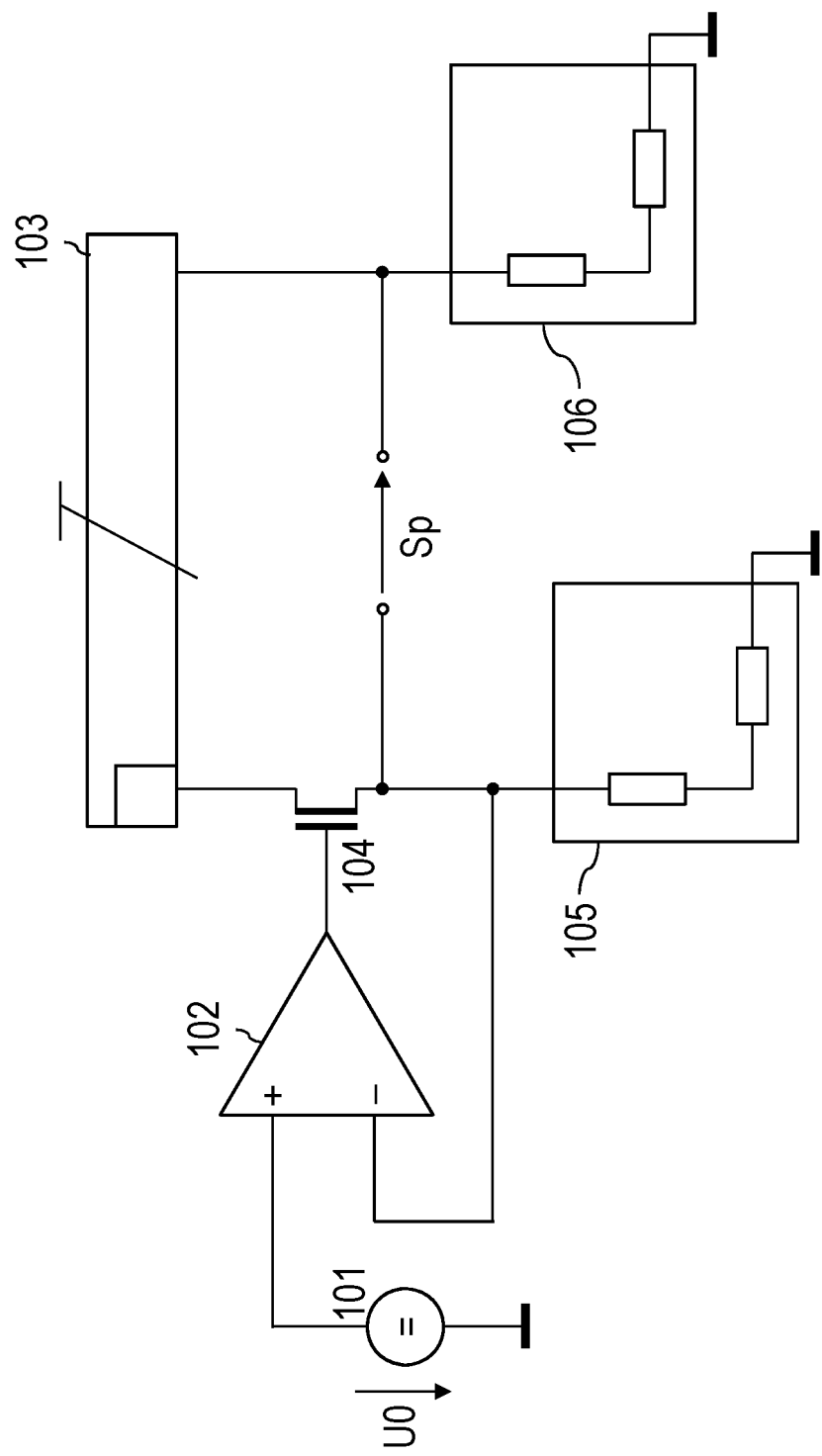
FIG. 1 shows an exemplary circuit for determining a signal Sp which is proportional to a sum of normal stress components at, in or along a chip surface.

The mechanical stress $\sigma$ is a force per surface unit, which has an effect at an imagined cut surface through an object, a fluid (liquid) or a gas.

A stress tensor is a second-order tensor, which describes the power transfer in an arbitrary oriented cut surface through a predefined spot within the subject. Its components have the dimension force per unit area, for which solid state physics provides the unit, e.g., mega pascal (MPa), which corresponds to Newton per square millimeter (N/mm²). In an imagined cut surface through the subject, the imagined cut-away subject exerts a force per unit area on the remaining subject, which comprises a vector of a normal stress component $\sigma_{nn}$ (acting rectangular to a cut surface t) and two shear stress components $\sigma_{tn}$ (acting in the cut surface t). Reference is made, e.g., to http://de.wikipedia.org/wiki/Spannungstensor. The shear stress components are also referred to as $\tau_{tn}$. The first index refers to the direction of a surface normal and the second index refers to the direction of the force. Hence, the normal stress components have same indices and the shear stress components have different indices.

The mechanical stress is thus a tensor comprising six independent components:
  normal stress components: $\sigma_{xx}$, $\sigma_{yy}$ and $\sigma_{zz}$;
  shear stress components: $\sigma_{xy}$, $\sigma_{xz}$ and $\sigma_{yz}$.

The mechanical stress that affects a chip surface or that has an effect near the chip surface is of interest, in particular in case electronic components are arranged on such chip surface. The chip surface may be the x-y-plane, wherein the z-axis is arranged perpendicular to the chip surface.

In many applications, the chip may have a large plane compared to its height, i.e. the expansions in x- and y-direction are large compared to the expansion in z-direction. An exemplary chip may have a chip area (plane) of 2 millimeter times 3 millimeter and a height (expansion in z-direction) amounting to 0.2 mm.

The chip may, e.g., be glued or soldered on a leadframe within a housing, wherein the leadframe may be flat (hence have a small expansion in z-direction). The chip and leadframe may be coated in plastic, the overall structure may hence be regarded as a laminate. The laminate comprising chip, leadframe and plastic has a large x-y-area compared to its z-height (thickness).

Hence, on the chip surface in a distance, which is larger as the height (thickness) of the chip, to the edge (border) the principle of St. Venant applies: the normal stress components $\sigma_{xx}$ and $\sigma_{yy}$ dominate over the remaining stress components. The shear stress $\sigma_{xy}$ may continue to have a relevant meaning in the vicinity of the corner of the chip. Hence, hereinafter in particular the stresses $\sigma_{xx}$, $\sigma_{yy}$ and $\sigma_{xy}$ will be considered.

Known stress compensation circuits bear the disadvantage that no arbitrary mechanical stress components can be determined. For example, it is not possible by known approaches to determine the normal stress component $\sigma_{xx}$, the linear combination of mechanical stresses $\sigma_{xx}+1,349\cdot\sigma_{yy}$, or the sum of the squares of mechanical stresses $(\sigma_{xx})^2+(\sigma_{yy})^2$.

There are numerous use case scenarios in which a circuit (not only a sensor circuit) uses components, which are not only dependent on the mechanical stress $\sigma_{xx}+\sigma_{yy}$ as sum of normal stress components, but also on other not negligible mechanical stress components.

For example, an oscillator with low power input can be realized with long N-MOS transistors. A current yield β of an N-MOS transistor depends on the mechanical stress that has an effect on it:

$$\beta = \beta_0 \cdot \left(1 - \frac{17.6\%}{GPa} \cdot \sigma_{xx} - \frac{31.2\%}{GPa} \cdot \sigma_{yy}\right)$$

This formula in particular applies for N-MOS transistors having a direction of current flow in [110]-direction. As coefficients piezo-resistive coefficients for low n-doped silicon are assumed.

Coefficients are disclosed in, e.g., [Yozo Kanda: Piezoresistance effect of silicon; Sensors and Acutators A, 28 (1991), 83-91] and amount for low n-doping to $$\pi^n_{11} = -\frac{102.2\%}{GPa}, \quad \pi^n_{12} = \frac{53.4\%}{GPa}, \quad \pi^n_{44} = \frac{-13.6\%}{GPa}$$

and for low p-doping to $$\pi^p_{11} = \frac{6.6\%}{GPa}, \quad \pi^p_{12} = \frac{-1.1\%}{GPa}, \quad \pi^p_{44} = \frac{138.1\%}{GPa}.$$

For the directional dependency of a resistor the following applies:

$$R = R_0 \cdot \left(1 + \frac{\pi_{11}+\pi_{12}}{2}(\sigma_{xx}+\sigma_{yy}) + \frac{\pi_{44}}{2}(\sigma_{xx}-\sigma_{yy})\cdot\cos(2\alpha) + (\pi_{11}-\pi_{12})\sigma_{xy}\cdot\sin(2\alpha) + \pi_{12}\sigma_{zz}\right),$$

wherein α indicates an angle between the x-axis ([−1,1,0]) and the resistor. The y-axis ([−1,−1,0]) corresponds to an angle α=+90°.

The percent-numerical values mentioned herein are exemplary for a low-doped n-region ($N_D<10^{18}/cm^3$); in case of higher charge carrier densities in the n-channel the numerical values can be smaller with regard to their absolute value.

In case the transistor, e.g., the current yield of the transistor, and thus the frequency of the exemplarily mentioned oscillator needs to be substantially independent from the mechanical stress, advantageously the mechanical stresses $\sigma_{xx}$, $\sigma_{yy}$ are initially determined individually in order to combine them as described above and generate a compensation signal (see also FIG. 6), which can be used to counteract the dependency of the oscillation frequency from the mechanical stress.

Further, there are components, wherein characteristics of the components may depend in a non-linear manner on mechanical stress that affects the component. For example, it is known that bipolar transistors not only depend on the mechanical stress $\sigma_{xx}+\sigma_{yy}$, but also on the cross product of the mechanical stress $\sigma_{xx}\cdot\sigma_{yy}$, and on the sum of the squares of the mechanical stress $(\sigma_{xx})^2+(\sigma_{yy})^2$.

Hence, it is appropriate that via stress sensor(s) also the mechanical stress components $\sigma_{xx}$ and $\sigma_{yy}$ can individually be provided in order to conduct a suitable compensation.

Further, there are technologies utilizing so-called deep trenches to isolate adjacent components on a chip. A component or a group of components may thus be surrounded by a ring-shaped trench structure to electrically isolate the component or the group of components from the remainder of the electronic circuit that is arranged on the chip. Initially a deep trench (of, e.g., 25 μm depth) is etched into the starting material; then, the sidewalls of the trench are covered with thin dielectric layers. Finally, the trench is filled with, e.g., poly-silicon. The filling material of the trench has a different mechanical parameter, i.e. a different modulus of elasticity (also referred to as E-modulus or Young's modulus) with different coefficients of thermal expansion (CTE) compared to the starting material. This results in a tension of the overall arrangement with complicated local distributions of mechanical stresses. Such effect may in particular occur in case the thickness of the semiconductor chip is only by a factor 2 to 4 larger than the depth of the trench, i.e. in case chips are thin ground (down to 100 μm or less). If, e.g., the lengths of the trench in x- and y-direction, i.e. parallel to the edges of the chip, differ in length and/or width or in case the distance between active areas of the respective component and the nearest trench in x- and y-direction are different, the component may depend on the mechanical stress $$\sigma_{xx\_a}+\sigma_{yy\_a}$$

at the active location "a" of the component. A measurement, however, may be conducted at a location "m" that is different from the active location "a" and provide the mechanical stress components $\sigma_{xx\_m}$ and $\sigma_{yy\_m}$.

Before an at least partial compensation of the effect of the mechanical stresses at the location "a" of the component can be made, it is an objective to know the mechanical stress $\sigma_{xx\_a} + \sigma_{yy\_a}$. This mechanical stress, however, can only be determined at the location "m" of the sensor (where the measurement actually occurs). To a certain extent, though, it can be concluded from the mechanical stress at the measurement location "m" to the mechanical stress at the location "a" of the component (e.g., by utilizing a linear approximation) as follows:

$$\sigma_{xx\_a} + \sigma_{yy\_a} = k_x \cdot \sigma_{xx_m} + k_y \cdot \sigma_{yy_m},$$

wherein $k_x \neq k_y$. This applies especially if the chip is inhomogeneous in lateral direction, e.g., due to deep trenches. If the chip, however, does not have any deep trenches and hence exhibits in linear direction (substantially) homogenous material, $k_x = k_y$ can be valid with adequate approximation.

Hence, it is of advantage to be able to individually determine the mechanical stress components $\sigma_{xx\_m}$ and $\sigma_{yy\_m}$ to then determine, e.g., any linear combination $$k_x \cdot \sigma_{xx\_m} + k_y \cdot \sigma_{yy\_m}$$

as an approximation (estimate) for $\sigma_{xx\_a} + \sigma_{yy\_a}$.

$\sigma_{xx\_m}$ and $\sigma_{yy\_m}$ are the normal stress components in x- and y-direction at the measurement location "m" and $\sigma_{xx\_a}$ and $\sigma_{yy\_a}$ are the normal stress components in x- and y-direction at the active location "a" of the (electronic) component which is to be compensated. At the location "m" the sensor does not measure the actual mechanical stress that impacts on the component at the location "a", but a compensation with the correcting factor k can be achieved via a deterministic coupling of the mechanical stresses at the locations "m" and "a". It is noted that "compensation" comprises an at least partial compensation or a full compensation of the effect, which is the result of the mechanical stress impacting on the component. Hence, a change of the characteristics of the component, which is exposed to mechanical stress, may at least partially be taken into consideration and at least partially be reduced or compensated via a compensation circuit.

For example, an active location "a" at which a Hall probe is arranged is 20 μm on the left of a deep trench. The stress sensor, however, is at a location "m" which is 10 μm on the right of the deep trench. The mechanical stress at both locations "a" and "m" is not identical. Yet, the fixed coupling of the locations according to $$\sigma_{xx\_a} + \sigma_{yy\_a} = k_2 \cdot (\sigma_{xx\_m} + k_1 \cdot \sigma_{yy\_m}), k_1 \neq 1$$

can be used, i.e. the x- and y-components of the stress tensor are not adjusted equally, but to a varying extent by leaving the measurement location "m" towards the active location "a".

The values of the correcting factors $k_1$, $k_2$ can be determined, e.g., empirically (via test series in the laboratory). They can be supplied to the compensation circuit as fixed or as programmable coefficients.

The solution described herein in particular enables individually (separately) determining mechanical stresses $\sigma_{xx\_m}$ and $\sigma_{yy\_m}$ and based thereon providing a linear combination $$k_2 \cdot (\sigma_{xx_m} + k_1 \cdot \sigma_{yy_m}).$$

It is in particular suggested determining any (arbitrary or non-arbitrary) combinations of mechanical stress components $\sigma_{xx}$ and $\sigma_{yy}$ based on two signals (i.e. two combinations of mechanical stresses), namely
(1) the signal $Sp = \sigma_{xx} + \sigma_{yy}$ and
(2) the signal $Sm = \sigma_{xx} - \sigma_{yy}$.

Mechanical stress sensors for determining Sp and mechanical stress sensors for determining Sm are known. On this occasion, sensors may advantageously be used which allow measurements at high sensitivity and which have a low error based on temperature fluctuations or manufacturing tolerances.

It is noted that the solutions described herein allow for any (linear) combinations based on the signals Sp and Sm in order to achieve an at least partial compensation of a disturbance caused by a mechanical stress.

For example, one of the following combinations of the signals Sp and Sm can be utilized for reducing a disturbance:

$$k_1 \cdot Sp + k_2 \cdot Sm$$

$$k_1 \cdot Sp^{e1} + k_2 \cdot Sm^{e2}$$

$$(k_1 \cdot Sp + k_2 \cdot Sm)^{e1}$$

Here, $k_1$, $k_2$ are positive or negative real-valued coefficients and e1, e2 are positive or negative real-valued exponents.

Reducing the disturbance may be achieved by multiplying a signal S1, which corresponds to a non-compensated output signal, with a combination of the signals Sp and Sm which is increased by a value 1 as follows:

$$S1_{comp} = S1 \cdot (1 + k_1 \cdot Sp + k_2 \cdot Sm).$$

This corresponds to a multiplicative compensation. For example, an oscillator frequency of a relaxation oscillator may increase by 3% due to an increase of the mechanical normal stress components at the chip surface, because the current, which reloads the capacity of the relaxation oscillator, is increased by 3% due to a mechanical stress that impacts on those parts of the circuit, which determine the current. In such case, the current can be processed by a current amplifier, e.g., a current mirror, which has a gain factor that is proportional to $$1 + k_1 \cdot Sp + k_2 \cdot Sm.$$

Here, the coefficients $k_1$ and $k_2$ are selected such that the gain factor as a result of the impacting mechanical stress is reduced by 3% and thus counteracts the increase of the mechanical normal stress components. The gain factor of the current amplifier is thus specifically made dependent on the signals Sp and Sm in order to counteract the increasing current due to mechanical stress.

Further to the multiplicative compensation also an additive compensation can be used according to $$S1_{comp} = S1 + k_1 \cdot Sp + k_2 \cdot Sm.$$

In such scenario the non-compensated output signal S1 is not combined in a multiplicative but in an additive manner with a combination of Sp and Sm. Such compensation is of advantage in case a zero point error of a measuring bridge occurs due to the influence of mechanical normal stress components and may hence advantageously at least partially be eliminated via an appropriate subtraction.

Stress Sensors for Determining Sp

Mechanical stress sensors for determining Sp are disclosed in U.S. Pat. No. 7,980,138 B1 or in US 2012/0210800 A1, which are hereby incorporated by reference.

For example, at least two resistive components of different doping can be used: In an exemplary embodiment an n-doped resistor is compared with a p-doped resistor; in another embodiment, an NMOS-transistor is compared with a PMOS-transistor; in yet another embodiment, a low doped n-resistor can be compared with a high doped n-resistor.

As an alternative, at least one lateral acting resistive element can be compared with at least one vertical acting resistive element. Here, the lateral acting resistive element shows a current flow substantially in parallel to the chip surface and the vertical acting resistive element shows a current flow substantially vertical to the chip surface.

FIG. 1 shows an exemplary circuit comprising a voltage source 101, which supplies a voltage U0 between the non-inverting input of an operational amplifier 102 and ground. The output of the operational amplifier 102 is connected to the gate of an NMOS 104. The source of the NMOS 104 is connected with the inverting input of the operational amplifier 102. A resistor unit 105 is arranged between the source of the NMOS 104 and ground.

The voltage U0 is copied via a feedback loop with the operational amplifier 102 and the NMOS 104 to the resistor unit 105. The current through the resistor unit 105 is decoupled by the NMOS 104 and via a trimmable current mirror 103 implanted in a resistor unit 106.

The input of the current mirror 103 is connected to the drain of the NMOS 104 and the output of the current mirror 103 is connected to ground via the resistor unit 106.

A voltage Sp is provided between the source of the NMOS 104 and the output of the current mirror 103. For adjustment purposes the trimmable current mirror 103 can be set such that the voltage Sp reaches zero.

The circuit of FIG. 1 hence compares the resistors of the resistor units 105 and 106. In case the mechanical stress that impacts on the resistor units 105 and 106 changes, the ratio of their resistance values changes, because the resistor unit 105 has a different dependency on the mechanical stress as does the resistor unit 106 and the voltage Sp deviates from zero. Such deviation is proportional to the mechanical stress components $\sigma_{xx}+\sigma_{yy}$, i.e. the sum of the normal stresses in the chip surface.

For example, the resistor unit 105 may comprise two lateral resistors that are arranged in an L-shape layout (i.e. the resistors are arranged perpendicular to each other in x- and y-direction, e.g., within the plane of the chip surface). Accordingly, the resistor unit 106 may comprise two lateral resistors that are arranged in an L-shape layout. The lateral resistors of the resistor unit 105 may have a first doping and the lateral resistors of the resistor unit 106 may have a second doping. The first doping may in particular be different from the second doping.

It is also an option that the resistor unit 105 comprises two lateral resistors in an L-shape layout and that the resistor unit 106 comprises one vertical resistor (i.e. one resistor with a current flow direction in z-direction).

In conventional practice it is often difficult to place an electrical contact in the depth of a semiconductor substrate in order to couple a (solely or substantially) perpendicular current flow in the resistor unit. Hence, at least two contacts may instead be placed close to the surface of the semiconductor substrate such that the current flow curves show a distinct arched form starting from a contact in the depth of the substrate back to the surface where the second contact is located.

Current flow curves of arched form are tantamount to a mixture of horizontal and vertical current flow curves, wherein their mixture varies based on the stretching of the arc. Thus, both resistor units 105 and 106 can be fabricated with the same technologically wells (and hence same doping profiles), wherein the contacts in the first resistor unit are closer together than in the second resistor unit. Thereby the arched form of the current flow curves in the second resistor unit is stretched more towards the horizontal as in the first resistor unit such that the actual vertical current flow portion is different in both resistor units. Hence, the influence on the resistors of the resistor units due to the mechanical stress is different.

Preferably, the resistor units 105 and 106 are arranged such that potential temperature fluctuations result in no or only limited (as low as possible) change of the resistance ratio. It is an option that the voltage Sp can be made (substantially) independent from a temperature fluctuation. This can be achieved by providing the voltage U0 in FIG. 1 (as control voltage) with an at least partially compensated temperature response. It is also an option for at least partially compensating temperature influences by determining the voltage Sp and multiplying it with a temperature-dependent factor.

Stress Sensors for Determining Sm

Mechanical stress sensors for determining Sm may be realized as follows: For example, two lateral resistor units may be arranged such that with regard to each other, substantially perpendicular flowing current occurs.

Both resistor units may also be connected in series; in this case the same current flows through both resistor units (this corresponds to a half-bridge arrangement). The electrical potential at a node between the two resistor units connected in series corresponds to ca. half the voltage dropping across both resistor units. This applies to a calibrated state with resistors being of the same resistance values. Deviations from this half voltage are substantially proportional to Sm.

Both of the resistor units that are connected in series may each comprise at least one resistor. Both resistor units may have the same resistance value or they may have different resistance values. For example, the first resistor unit may have a resistance value amounting to 3 kohm and the second resistor unit may have a resistance value amounting to 1 kohm. Without any mechanical stress applied to both resistor units, the node of the half-bridge provides a division of ¼ and ¾ of the total voltage of the series connection.

It is also an exemplary option to imprint a current in two lateral n-doped resistors, which are arranged perpendicular to each other. In this case, the difference of the voltages dropping across both resistors is proportional to Sm.

Figure 2:
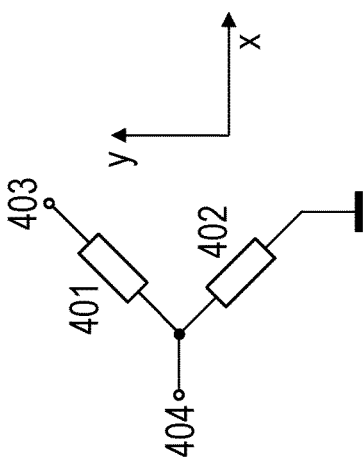
FIG. 2 shows an exemplary arrangement of two laterally arranged resistors for determining a signal Sm, which is proportional to a difference of normal stress components at, within, or along a chip surface.

FIG. 2 shows an exemplary arrangement of two laterally arranged resistors 201 and 202. The resistor 201 is exemplarily arranged in y-direction and the resistor 202 is exemplarily arranged in x-direction.

The resistor 201 is arranged between a terminal 203 and a node 204. The resistor 202 is arranged between the node 204 and ground. A supply voltage Vin is connected to the node 203, an output voltage Vout is tapped at the node 204. The arrangement shown in FIG. 2 corresponds to a half-bridge. The resistors 201 and 202 have low n-doped silicon, for example with a doping amounting to $N_D<10^{18}/cm^3$.

In the example shown in FIG. 2, the current flow direction of the resistor 201 is in parallel to the Miller index [110]. The dependency of its resistance value from the mechanical stress hence amounts to:

$$R_{201} = 1 - \frac{17.6\%}{GPa} \cdot \sigma_{xx} - \frac{31.2\%}{GPa} \cdot \sigma_{yy}.$$

The current flow direction of the resistor 202 is in parallel to the Miller index [1̄10]. The dependency of its resistance value from the mechanical stress hence amounts to:

$$R_{202} = 1 - \frac{31.2\%}{GPa} \cdot \sigma_{xx} - \frac{17.6\%}{GPa} \cdot \sigma_{yy}.$$

This results in the following ratio between the output voltage Vout and the supply voltage Vin (in particular in linear approximation for a mechanical stress of limited magnitude):

$$\frac{Vout}{Vin} = \frac{R_{202}}{R_{201} + R_{202}} =$$

$$\frac{1 - \frac{31.2\ \%}{GPa} \cdot \sigma_{xx} - \frac{17.6\ \%}{GPa} \cdot \sigma_{yy}}{2 - \frac{48.8\ \%}{GPa} \cdot (\sigma_{xx} + \sigma_{yy})} = \frac{1}{2} \cdot \left(1 - \frac{6.8\ \%}{GPa} \cdot (\sigma_{xx} - \sigma_{yy})\right).$$

Figure 3:
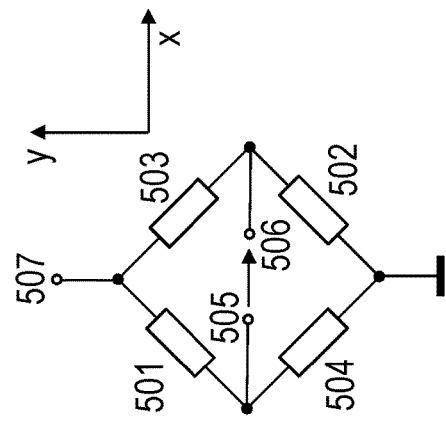
FIG. 3 shows an exemplary arrangement of four laterally in the form of a Wheatstone bridge arranged resistors for determining the signal Sm, which is proportional to the difference of the normal stress components at, within or along a chip surface.

FIG. 3 shows an exemplary arrangement of four resistors 301, 302, 303 and 304, which are arranged laterally as a Wheatstone bridge (also referred to as full bridge). The resistors 301 and 302 are exemplarily arranged in y-direction and the resistors 303 and 304 are exemplarily arranged in x-direction.

In the full bridge shown in FIG. 3 the current flows through the resistors 301 and 302 in a first direction and the current flows through the resistors 303 and 304 in a second direction, wherein the first direction and the second direction are (substantially) perpendicular to each other.

The resistor 301 is arranged between a terminal 307 and a node 305, the resistor 302 is arranged between a node 306 and ground, the resistor 303 is arranged between the terminal 307 and the node 306 and the resistor 304 is arranged between the node 305 and ground. A supply voltage Vin is fed to the terminal 307. An output voltage Vout is tapped between the node 305 and the node 306.

In the example shown in FIG. 3 the current flow directions of the resistors 301 to 304 are in parallel to the following Miller indices:

resistors 301 and 302: [110],
resistors 303 and 304: [$\bar{1}$10].

In case the resistors 301 to 304 are of low n-doped silicon, e.g., a doping amounting to $N_D < 10^{18}/cm^3$, the output voltage Vout results in:

$$Vout = -\frac{6.8\ \%}{GPa} \cdot (\sigma_{xx} - \sigma_{yy}).$$

In case the resistors 301 to 304 are of low p-doped silicon, e.g., a doping amounting to $N_A < 10^{18}/cm^3$, the output voltage Vout results in:

$$Vout = +\frac{69.05\ \%}{GPa} \cdot (\sigma_{xx} - \sigma_{yy}).$$

The examples may in particular refer to (100)-silicon, i.e. the chip surface is a (100)-plane and hence perpendicular to a [100]-direction.

In a common orientation of (100) wafers, the rectangular chips are sawed out of the wafer along the [110] and [$\bar{1}$10] directions. The x- and y-directions refer to the coordinate system of the chip and are in parallel to the edges of the chip.

The mechanical stress $\sigma_{xy}$ instead of the mechanical stresses $\sigma_{xx} - \sigma_{yy}$ may be determined by rotating the resistors shown in FIG. 2 and FIG. 3 by 45 degrees. In this case, n-doped resistors can be used in order to reach a higher sensitivity for the mechanical stress $\sigma_{xy}$ and p-doped resistors allow for a higher sensitivity for the mechanical stresses $\sigma_{xx} - \sigma_{yy}$. It is an option to use low n- or p-dopings, although high dopings would work as well.

Figure 4:
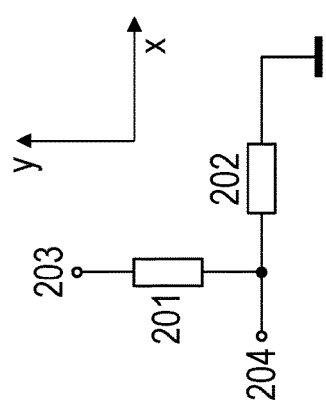
FIG. 4 shows an exemplary arrangement of two laterally arranged resistors which are in comparison to FIG. 2 rotated by 45 degrees and which are used for determining a signal, which is dependent from the mechanical shear stress $\sigma_{xy}$.

FIG. 4 shows an exemplary device comprising two laterally arranged resistors 401 and 402. The resistor 401 is exemplarily rotated by 45 degrees with regard to the x-axis in the x-y-plane and the resistor 402 is arranged orthogonal to the resistor 401.

The resistor 401 is arranged between a node 403 and a node 404 and the resistor 402 is arranged between the node 404 and ground. A supply voltage Vin is connected to the node 403 and an output voltage Vout is tapped at the node 404. The arrangement of FIG. 4 corresponds to a half-bridge. The resistor 401 and the resistor 402 have low n-doped silicon, for example with a doping amounting to $N_D < 10^{18}/cm^3$.

In the example shown in FIG. 4, the current flow direction of the resistor 401 is in parallel to the Miller index [100]. The dependency of its resistance value from the mechanical stress hence amounts to:

$$R_{401} = 1 - \frac{24.4\ \%}{GPa} \cdot (\sigma_{xx} + \sigma_{yy}) - \frac{155.6\ \%}{GPa} \cdot \sigma_{xy}.$$

The current flow direction of the resistor 402 is in parallel to the Miller index [010]. The dependency of its resistance value from the mechanical stress hence amounts to:

$$R_{402} = 1 - \frac{24.4\ \%}{GPa} \cdot (\sigma_{xx} + \sigma_{yy}) + \frac{155.6\ \%}{GPa} \cdot \sigma_{xy}.$$

This results in the following ratio between the output voltage Vout and the supply voltage Vin (in particular in linear approximation for a mechanical stress of limited magnitude):

$$\frac{Vout}{Vin} = \frac{R_{402}}{R_{401} + R_{402}} =$$

$$\frac{1 - \frac{24.4\ \%}{GPa} \cdot (\sigma_{xx} + \sigma_{yy}) + \frac{155.6\ \%}{GPa} \cdot \sigma_{xy}}{2 - 2 \cdot \frac{24.4\ \%}{GPa} \cdot (\sigma_{xx} + \sigma_{yy})} = \frac{1}{2} \cdot \left(1 + \frac{155.6\ \%}{GPa} \cdot \sigma_{xy}\right).$$

Figure 5:
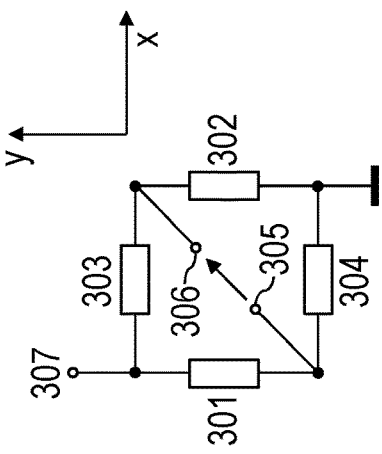
FIG. 5 shows an exemplary arrangement of four laterally in the form of a Wheatstone bridge arranged resistors, which are in comparison to FIG. 3 rotated by 45 degrees and which are used for determining a signal, which depends on the mechanical shear stress $\sigma_{xy}$.

FIG. 5 shows an exemplary arrangement of four resistors 501, 502, 503 and 504, which are arranged laterally as a Wheatstone bridge (also referred to as full bridge). The resistors 501 and 502 are exemplarily rotated by 45 degrees with regard to the x-axis in the x-y-plane and the resistors 503 and 504 are arranged orthogonal to the resistors 501 and 502.

In the full bridge shown in FIG. 3 the current flows through the resistors 501 and 502 in a first direction and the current flows through the resistors 503 and 504 in a second direction, wherein the first direction and the second direction are perpendicular to each other.

The resistor 501 is arranged between a terminal 507 and a node 505, the resistor 502 is arranged between a node 506 and ground, the resistor 503 is arranged between the terminal 507 and the node 506 and the resistor 504 is arranged between the node 505 and ground. A supply voltage Vin is fed to the terminal 507. An output voltage Vout is tapped between the node 505 and the node 506.

In the example shown in FIG. 5 the current flow directions of the resistors 501 to 504 are in parallel to the following Miller indices:
resistors 501 and 502: [100],
resistors 503 and 504: [010].

In case the resistors 501 to 504 are of low n-doped silicon, e.g., a doping amounting to $N_D < 10^{18}/cm^3$, the output voltage Vout results in:

$$Vout = \frac{155.6\ \%}{GPa} \cdot \sigma_{xy}.$$

Further Embodiments and Advantages

In addition to resistors, it is also an option to use transistors, in particular MOS-transistors, as sensors for detecting a mechanical stress. On this occasion, the effect can be utilized that the mechanical stress depends on the mobility of the majority charge carriers.

For example, two MOS-transistors may be placed such that the respective current flows passing the two MOS-transistors are perpendicular to each other. The two MOS-transistors may in such case preferably arranged in parallel to the chip surface. It is also an option that the gates of the MOS-transistors are connected with each other and that the sources of the MOS-transistors are connected with each other. In case a current is fed to the sources of the MOS-transistors (i e imprinted in case of NMOS-transistors, extracted in case of PMOS transistors), a ratio of their drain currents (i.e. currents, which flow via the drain terminals) is obtained based on the W/L-ratios of the MOS-transistors (W: width, L: length of the space charge region). If the W/L-ratio of both MOS-transistors is the same, the ratio of the drain currents is proportional to the signal $1 + k \cdot Sm,$ wherein $k \cdot Sm$ is small compared to 1. In other words, the current mirror ratio is near the value 1 in case of identical W/L-ratio and only the small deviation from the value 1 is influenced by the mechanical stress.

This approach is in particular of advantage for transistors with current flow directions that are in parallel to the Miller indices [110] and [$\bar{1}$10]. In particular, the piezo coefficient k is rather large for PMOS transistors.

If the current flow directions through the transistors pass in [100] and [010]-directions, the current mirror ratio is proportional to $1 + k \cdot \sigma_{xy},$ wherein in case NMOS-transistors are used, the piezo coefficient k is rather large, which is beneficial.

Such an arrangement comprising two MOS-transistors can be described as current mirror. As an alternative, the two MOS-transistors can be used as a short-circuited differential input of an operational amplifier. These examples can be combined with a cascode (e.g., a cascode circuit comprising at least two transistors for amplification purposes) and/or with degenerative resistors connected to the sources. Such degenerative resistors may be realized as lateral resistors with orthogonal current flow directions (to each other). Utilizing degeneration resistors arranged in such way enables high sensitivities of the output current ratio depending on the mechanical stress $\sigma_{xx} - \sigma_{yy}$.

For example, for such approach a current mirror can be used as described in [H. Kittel et al.: Novel Stress Measurement System for Evaluation of Package Induced Stress, published in: Integration Issues of Miniaturized Systems—MOMs, MOEMS, ICS and Electronic Components (SSI), 2008 2nd European Conference & Exhibition, 9-10 Apr. 2008, p. 1 to 8, Barcelona, Spain, ISBN 978-3-8007-3081-0, publisher: VDE].

Also, two MOS-transistors can be used as input stage of an operational amplifier as described in [YUE Rui-feng et al.: Stress-sensitive MOS Operational amplifier; Institute of Microelectronics, Tsinghua Univerity, Beijing 100084, China, ATCA ELECTRONICA SINICA, Vol. 29, No. 8, August 2001].

Figure 6:
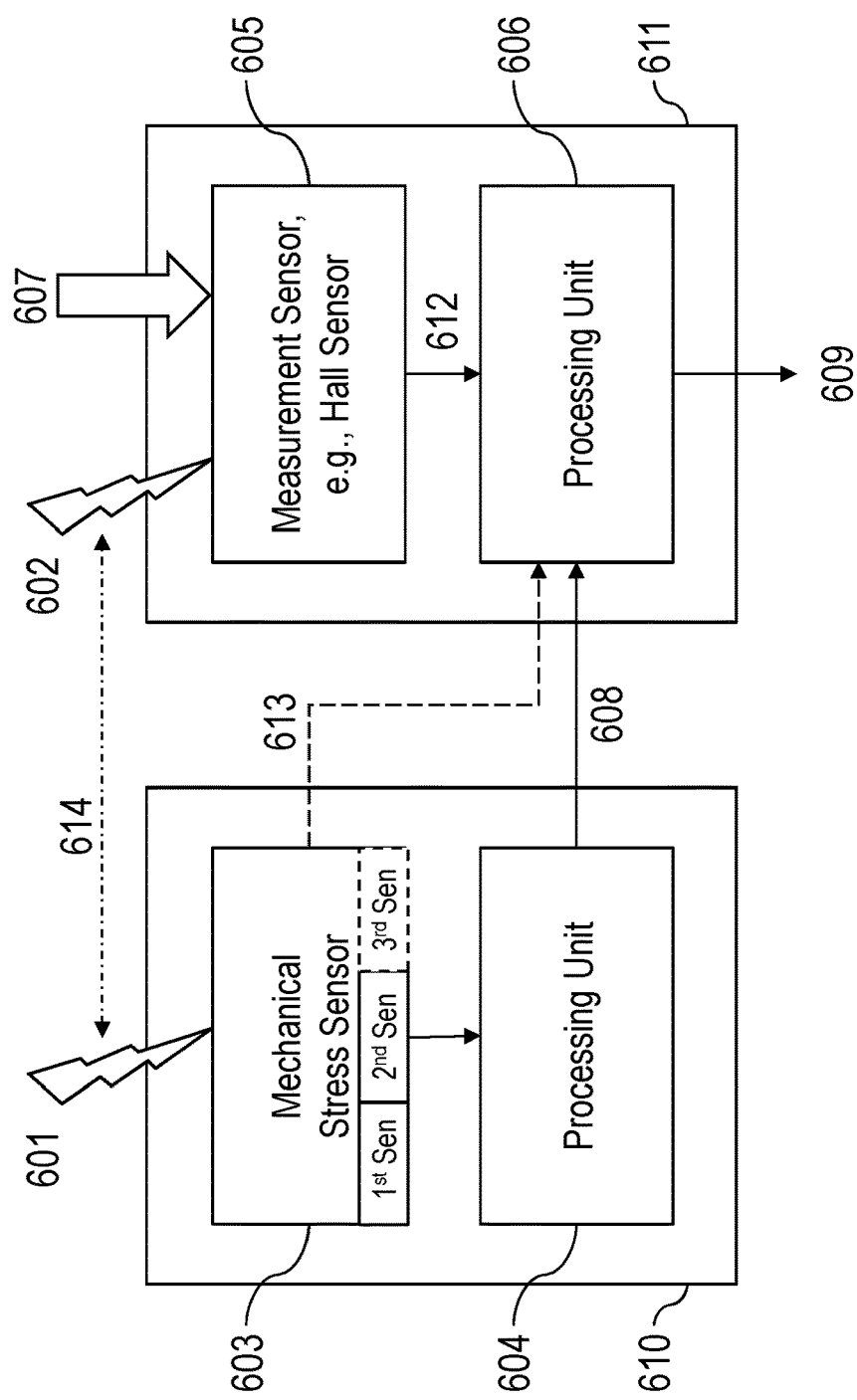
FIG. 6 shows a schematic circuit arrangement of a compensation circuit for reducing the influence of mechanical stresses on a measurement result.

FIG. 6 shows a schematic circuit diagram for a compensation circuit in order to reduce influences of mechanical stresses on a measurement result.

Hence, impacts of mechanical stresses on a component or a circuit comprising several components can at least partially be compensated.

For example, the circuit shown in FIG. 6 comprises two circuit portions 610 and 611, wherein these circuit portions could also be integrated (partially or fully) in (or as) a circuit. A measurement sensor 605 determines a measurement signal 612 based on a physical value 607. For example, the measurement signal 612 may be a Hall voltage, which is determined by a Hall sensor as measurement sensor 605 based on an applied magnetic field as physical value 607. Here, the measurement sensor 605 is not only exposed to the physical value 607 to be measured, but also to a mechanical stress 602, which interferes with and disturbs the measurement signal 612.

In order to reduce or at least partially compensate the disturbance, a mechanical stress sensor 603 is provided for detecting a mechanical stress 601. The mechanical stress sensor 603 may comprise a first sensor for detecting a first signal based on a sum of a first normal stress component and a second normal stress component and a second sensor for determining a second signal based on a difference of the first normal stress component and the second stress component.

The mechanical stress 601 and the mechanical stress 602, which has an effect on the measurement sensor 605, are subject to a deterministic coupling (indicated by an arrow 614). Hence, the mechanical stress 601 that occurs at the location of the stress sensor 603 can be used to reduce the disturbance that impacts the measurement sensor 605 due to the mechanical stress 602.

For this purpose, the mechanical stress 601 is determined by the mechanical stress sensor 603, processed in a suitable way by a processing unit 604 and as a control signal 608 provided towards a processing unit 606. The processing unit 606 determines a compensated output signal 609 based on the measurement signal 612 and the control signal 608.

As an option, the processing unit 604 may be omitted and the mechanical stress sensor 603 may convey its signal to the processing unit 606 (this is indicated as a connection 613).

It is noted that the compensation described herein can be used for any measurement sensor 605 or any component or any circuit. Hence, the measurement sensor 605 is regarded as only a single exemplary embodiment of many. Instead of the measurement sensor 605 or in addition to such measurement sensor 605 at least one of the following components or elements can be provided: a reference voltage source, a reference current source, an oscillator (as reference frequency source), a clock or any type of timer.

For example, a commonly used quartz crystal may no longer be necessary for applications that require a reference frequency source (i.e. a frequency normal). Instead, the compensation circuit described herein can be used. Without the requirement of a quartz crystal to be part of the circuit, a higher degree of integration in the chip is made possible.

Another example refers to (rechargeable) batteries, which are to be recharged with an exact voltage in order to optimize their durability. A precise charging voltage requires an accordingly precise reference voltage. This reference voltage can be supplied utilizing the compensation circuit as described herein.

A compensation circuit for compensating the influences of external mechanical stresses on physical function parameters of integrated circuits is also described in DE 101 54 495 B4 and U.S. Pat. No. 6,906,514 B1, which is herewith incorporated by reference.

The examples suggested herein may in particular be based on at least one of the following solutions. In particular combinations of the following features could be utilized in order to reach a desired result. The features of the method could be combined with any feature(s) of the carrier, device, apparatus or system or vice versa.

A carrier of an electronic circuit (in particular for an electronic circuit) is provided
comprising a first sensor for determining a first signal based on a sum of a first normal stress component and a second normal stress component,
comprising a second sensor for determining a second signal based on a difference between the first normal stress component and a second normal stress component.

The first sensor as well as the second sensor may each comprise at least one sensor element. In particular, each of the sensors may comprise several sensor elements, e.g., n- or p-doped resistor elements, which are able to detect a current flow in different directions to each other, e.g., (substantially) perpendicular to each other. The first and/or second sensor can for example be embodied as a half bridge or a full bridge arrangement. The first signal can be a difference voltage between the sensor elements and/or between elements of the sensors. This applies for the second signal accordingly.

The carrier with the first and the second sensor allows detecting individual normal stress components and hence any combinations of normal stress components which may then be considered by a compensation circuit.

It is noted that there are two normal stress components in a plane, which substantially determines a layer in or parallel to a surface of the carrier. Further, there exists a third normal stress component, which is perpendicular to this plane.

The carrier of the electronic circuit can be arranged as a semiconductor carrier. The carrier may comprise or may be of different materials or substances, e.g., glass, ceramic, or print plate.

In an embodiment, the first normal stress component and the second normal stress component are arranged in parallel to a surface of the carrier.

As an option, the first normal stress component and the second normal stress component are orthogonal to each other and span a plane, which is within the surface of the carrier or lies in parallel to the surface of the carrier.

It is further noted that the surface of the carrier may be macroscopically planar. As an alternative the surface may comprise a profile or profiling.

In an embodiment, the first sensor and the second sensor are arranged at a common location.

The common location may be a joint location or the first sensor and the second sensor may be placed together, in particular close or adjacent to one another.

In an embodiment, the first sensor and the second sensor are arranged adjacent to each other.

In an embodiment, the carrier is a substrate.

In an embodiment, the carrier is arranged on or within a chip or a laminate.

The laminate may comprise in particular a chip, a leadframe and/or a plastic coating.

In an embodiment, the first sensor and/or the second sensor comprises the following elements:
at least one n- or p-doped component, in particular a resistor, a diode or a transistor;
a series connection comprising at least two resistors;
two resistors, wherein one of the resistors is arranged substantially orthogonal to the other resistor.

In an embodiment, the carrier comprises a third sensor for determining a third signal which is based on a shear stress in a plane of the first normal stress component and the second normal stress component.

Further, a circuit is suggested for reducing a disturbance, which is based on a mechanical stress, the circuit comprising:
a first sensor for determining a first signal based on a sum of a first normal stress component and a second normal stress component;
a second sensor for determining a second signal based on a difference of the first normal stress component and the second normal stress component;
a processing unit, which is arranged to reduce based on the first signal and the second signal a disturbance that resulted from the mechanical stress.

The circuit may use the carrier as described herein in combination with the processing unit to reduce and/or compensate the disturbance caused by the mechanical stress. It is noted that the term compensating with regard to the examples described herein also refers to a partial compensation. Hence, the effect that results from the mechanical stress may be fully or partially compensated.

It is an option that the first sensor and the second sensor comprises at least one shared (common) component, e.g., a resistor, a resistor element, a transistor, etc.

In an embodiment, the first normal stress component and the second normal stress component are arranged in parallel to a surface of a chip.

The circuit described herein may in particular be arranged on the chip.

In an embodiment, the processing unit is arranged to supply a control signal based on the first signal and the second signal, wherein based on the control signal the invoked disturbance of at least one electronic component is at least partially reduceable, wherein the invoked disturbance is caused by the mechanical stress.

The disturbance may affect the at least one electronic component. Based on the sensors (first and second sensor) described herein it is possible to determine the mechanical stress which is responsible for the disturbance affecting the at least one electronic component. Based on the awareness of disturbance a post-processing or a pre-processing can be conducted such that the signal provided by the at least one electronic component is (more or less) the same as if the mechanical stress would not exist (or would only barely exist). The effect of the disturbance (based on the mechanical stress) on the provided signal may hence be effectively reduced.

It is noted that the phrase "the disturbance is reduced" implicitly comprises that the effect that results from the disturbance is reduced. Insofar, it is not about reducing the occurring mechanical stress itself, but to reduce the effect, hence the disturbance, that results from said mechanical stress.

In an embodiment, the at least one electronic component comprises at least one of the following:
  a measurement sensor,
  a pressure sensor,
  a Hall sensor, in particular comprising Hall plates,
  an oscillator, in particular a relaxation oscillator,
  a voltage source, in particular a constant voltage source based on a band gap,
  a current source, in particular a constant current source,
  a temperature sensor.

In an embodiment, the processing unit is arranged to reduce the disturbance caused by the mechanical stress based on a linear combination or a non-linear combination of the first signal and the second signal.

In an embodiment, the circuit
  further comprises a third sensor for determining a third signal, which is based on a shear stress in a plane of the first normal stress component and the second normal stress component,
  wherein the processing unit is arranged for reducing the disturbance caused by the mechanical stress based on the first signal, the second signal and the third signal.

For example, the third signal may be proportional to a shear stress within the plane, which is determined by the surface of the chip or which is in parallel to such surface. For example, the first normal stress component may extend x-direction and the second normal stress component may extend in y-direction. The shear stress mentioned herein may then exemplarily run within the x-y-plane.

Accordingly, other (additional) sensors may be utilized for measuring additional shear stresses or normal stresses. Signals provided by such sensors may be used to reduce the disturbance caused by the mechanical stress. It is noted that mechanical stress in that sense may include several mechanical stress components (mechanical stresses).

The processing unit referred to herein may comprise at least one processor and/or at least one hard-wired or logic circuitry, which may be arranged to conduct the steps of the method as described herein. The processing unit may be any type of processor, computer or processing device with beneficial periphery (memory, input/output interfaces, input/output devices, etc.).

The explanations provided herein for the devices (carrier, circuit) may apply correspondently to the method and vice versa. The respective device may be implemented as a single component or it may be distributed among several components.

A method is provided, said method comprising:
  reducing via a first signal and via a second signal a disturbance, which is caused by mechanical stress,
  wherein the first signal of a first sensor is determined based on a sum of a first normal stress component and a second normal stress component and
  wherein the second signal of a second sensor is determined based on a difference of the first normal stress component and the second normal stress component.

In an embodiment, the method further comprises:
  providing a control signal based on the first signal and the second signal, wherein the disturbance of at least one electronic component caused by mechanical stress is at least partially reduceable by the control signal.

In an embodiment, the at least one electronic component comprises at least one sensor for detecting a physical quantity (physical size or physical value).

In an embodiment, the at least one electronic component comprises a circuit.

Also, a device is suggested, comprising
  means for reducing via a first signal and via a second signal a disturbance which is caused by mechanical stress,
  wherein the first signal of a first sensor is determined based on a sum of a first normal stress component and a second normal stress component and
  wherein the second signal of a second sensor is determined based on a difference of the first normal stress component and the second normal stress component.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A carrier, comprising:
   a first electronic circuit portion including (i) a first stress sensor configured to output a first stress signal in response to a mechanical stress, the first stress signal corresponding to a sum of a first normal stress component and a second normal stress component, and (ii) a second stress sensor configured to output a second stress signal in response to the mechanical stress, the second stress signal corresponding to a difference between the first normal stress component and the second normal stress component; and
   a second electronic circuit portion that is coupled to the first electronic circuit portion, the second electronic circuit portion configured to receive a measurement signal which depends on the first and the second normal stress components, and to generate an output signal with a reduced dependence on at least one of the first and the second normal stress components based on a combination of the first stress signal and the second stress signal.

2. The carrier according to claim 1, wherein the first normal stress component and the second normal stress component are arranged in parallel to a surface of the carrier.

3. The carrier according to claim 1, wherein the first stress sensor and the second stress sensor are arranged substantially the same location.

4. The carrier according to claim 1, wherein the first stress sensor and the second stress sensor are arranged adjacent to each other.

5. The carrier according to claim 1, wherein the carrier is a substrate.

6. The carrier according to claim 1, wherein the carrier is arranged on or within a chip or a laminate.

7. The carrier according to claim 1, wherein the first stress sensor or the second stress sensor comprises:
   at least one n- or p-doped resistor, diode or transistor,
   a series connection comprising at least two resistors; or
   two resistors arranged substantially orthogonal to one another.

8. The carrier according to claim 1, wherein the first electronic circuit portion further includes a third stress sensor configured to output a third stress signal in response to a mechanical stress, the third stress signal corresponding to a shear stress in a plane of the first normal stress component and the second normal stress component.

9. A circuit for compensating for a disturbance, which is based on a mechanical stress, the circuit comprising:
   a first stress sensor configured to output a first stress signal in response to the mechanical stress, the first stress signal corresponding to a sum of a first normal stress component and a second normal stress component;
   a second stress sensor configured to output a second signal in response to the mechanical stress, the second stress signal corresponding to a difference of the first normal stress component and the second normal stress component; and
   a first processor, which is arranged to receive a measurement signal which depends on the first and the second normal stress components, and to generate an output signal with a reduced dependence on at least one of the first and the second normal stress components based on a combination of the first stress signal and the second stress signal.

10. The circuit according to claim 9, wherein the first normal stress component and the second normal stress component are in parallel to a surface of a chip.

11. The circuit according to claim 9, further comprising:
    a second processor arranged to supply a control signal based on the first stress signal and the second stress signal, and
    wherein, based on the control signal, the disturbance of at least one electronic component is at least partially compensatable via the first processor.

12. The circuit according to claim 11, wherein the at least one electronic component comprises:
    a measurement sensor,
    a pressure sensor,
    Hall plates,
    a relaxation oscillator,
    a constant voltage source based on a band gap,
    a constant current source, or
    a temperature sensor.

13. The circuit according to claim 9, wherein the first processor is arranged to compensate for the disturbance caused by the mechanical stress based on a linear combination or a non-linear combination of the first normal stress component and the second normal stress component of the first stress signal and the second stress signal.

14. The circuit according to claim 9, comprising:
    a third stress sensor configured to output, in response to the mechanical stress, a third stress signal, the third stress signal corresponding to a shear stress in a plane of the first normal stress component and the second normal stress component, and
    wherein the first processor is arranged for compensating for the disturbance caused by the mechanical stress based on the first stress signal, the second stress signal, and the third stress signal.

15. A method comprising:
compensating, via a first stress signal and via a second stress signal, a disturbance, which is caused by mechanical stress,
wherein the first stress signal of a first stress sensor is output in response to the mechanical stress, the first stress signal corresponding to a sum of a first normal stress component and a second normal stress component,
wherein the second stress signal of a second stress sensor is output in response to the mechanical stress, the second stress signal corresponding to a difference of the first normal stress component and the second normal stress component; and
wherein the compensating includes (i) receiving a measurement signal that depends on the first and the second normal stress components, and (ii) generating an output signal with a reduced dependence on at least one of the first and the second normal stress components based on a combination of the first stress signal and the second stress signal.

16. A method according to claim 15, further comprising:
providing a control signal based on the first stress signal and the second stress signal, wherein the disturbance is of at least one electronic component, is caused by the mechanical stress, and is at least partially compensated for by the control signal.

17. A method according to claim 16, wherein the at least one electronic component comprises at least one sensor configured to detect a physical quantity.

18. A method according to claim 16, wherein the at least one electronic component comprises a circuit.

19. A device comprising:
means for compensating, via a first stress signal and via a second stress signal, a disturbance which is caused by mechanical stress,
wherein the first stress signal of a first stress sensor is output in response to the mechanical stress, the first stress signal corresponding to a sum of a first normal stress component and a second normal stress component,
wherein the second stress signal of a second stress sensor is output in response to the mechanical stress, the second stress signal corresponding to a difference of the first normal stress component and the second normal stress component, and
wherein the means for compensating includes (i) receiving a measurement signal that depends on the first and the second normal stress components, and (ii) generating an output signal with a reduced dependence on at least one of the first and the second normal stress components based on a combination of the first stress signal and the second stress signal.

* * * * *